US012510188B2

(12) United States Patent
Wang

(10) Patent No.: US 12,510,188 B2
(45) Date of Patent: Dec. 30, 2025

(54) U-SHAPED TUBE ENGAGEMENT STRUCTURE AND METHOD OF FORMING THE SAME

(71) Applicant: Kai-Sheng Wang, Hsinchu (TW)

(72) Inventor: Kai-Sheng Wang, Hsinchu (TW)

( * ) Notice: Subject to any disclaimer, the term of this patent is extended or adjusted under 35 U.S.C. 154(b) by 4 days.

(21) Appl. No.: 18/771,077

(22) Filed: Jul. 12, 2024

(65) Prior Publication Data

US 2025/0122955 A1 Apr. 17, 2025

(30) Foreign Application Priority Data

Oct. 12, 2023 (TW) ................................ 112138967

(51) Int. Cl.
*F16L 3/10* (2006.01)
*B21D 22/02* (2006.01)

(52) U.S. Cl.
CPC .............. *F16L 3/105* (2013.01); *B21D 22/02* (2013.01)

(58) Field of Classification Search
CPC ........ F16L 3/105; F16L 3/2431; B21D 22/02; B21D 28/06; F16B 7/187
USPC ....... 248/65, 67, 67.5, 70, 727, 3, 74.1, 74.4
See application file for complete search history.

(56) References Cited

U.S. PATENT DOCUMENTS

| | | | | |
|---|---|---|---|---|
| 1,452,993 A * | 4/1923 | Wack | F16L 3/10 | 248/300 |
| 6,494,415 B1 * | 12/2002 | Roth | F16L 3/243 | 248/62 |
| 6,700,064 B2 * | 3/2004 | Aoki | B60R 16/0215 | 248/74.1 |
| 7,591,442 B2 * | 9/2009 | Dinh | F16L 3/1033 | 248/62 |
| 7,735,270 B2 * | 6/2010 | Olle | F16L 3/243 | 52/505 |
| 8,181,916 B2 * | 5/2012 | Azuma | F16L 3/127 | 52/480 |
| 8,322,661 B2 * | 12/2012 | Oh | F16L 3/10 | 248/62 |
| 2006/0284027 A1 * | 12/2006 | Smith | F16L 3/04 | 248/65 |
| 2011/0084179 A1 * | 4/2011 | Wiedner | F16L 3/12 | 248/67.7 |
| 2017/0299102 A1 * | 10/2017 | Ash | F16L 3/105 | |
| 2025/0122955 A1 * | 4/2025 | Wang | F16L 3/2431 | |

* cited by examiner

*Primary Examiner* — Muhammad Ijaz
(74) *Attorney, Agent, or Firm* — Demian K. Jackson; Jackson IPG PLLC

(57) ABSTRACT

A U-shaped tube engagement structure contains a fixing sheet, an abutting sheet, a locking bolt, and a screw. After machining the abutting sheet, the abutting sheet is parallelly stacked below the fixing sheet, and a center of a force portion corresponds to an internal threaded section below a defining portion of the locking bolt, the fixing sheet and the abutting sheet are machined so that a first segment and a second segment of the fixing sheet are accurately bent and are perpendicular to a top edge and form an arcuate receiving space with the force portion of the abutting sheet.

9 Claims, 15 Drawing Sheets

U-SHAPED TUBE ENGAGEMENT STRUCTURE AND METHOD OF FORMING THE SAME

TECHNICAL FIELD

The present invention relates to a tube engagement structure, and more particularly to a U-shaped tube engagement structure and a method of forming the same which are capable of simplifying operations to save working time and labor.

BACKGROUND

A conventional tube engagement structure is configured for fixing multiple tubes (such as water tubes or electrical pipes), and each tube/pipe must be fixed with certain spacing requirements. Referring to FIGS. 14 and 15, a conventional tube engagement structure 90 contains two bent sheets 91, a first screw bolt 92, and a second screw bolt 93. Each bent sheet 91 includes a square segment 911, a cutout 912 defined adjacent to the square segment 911, a circular trimmed segment 913, a through orifice 914 proximate to the circular trimmed segment 913. After connecting the two bent sheets 91 on a support element 80 to clamp a tube 70, the cutout 912 of each bent sheet 91 is fitted with an open segment of the support 80 so as to engage with two hooking portion 81 of the support element 80, and the circular trimmed segment 913 abuts against a peripheral side of the tube 70, the first screw bolt 92 and the second screw bolt 93 are inserted through the through orifice 914 of each bent sheet 91 to defined the tube in the circular trimmed segment 913 loosely. When the tube 70 is moved to a desired position, the first screw bolt 92 and the second screw bolt 93 are forced to engage the cutout 912 with the hooking portion 81 of the support element 80, and the circular trimmed segment 913 of each bend sheet 91 fixes the tube 70 securely.

The conventional tube engagement structure 90 is applied to fix the tube 70, but it is inconvenient for a user to operate the conventional tube engagement structure 90. For example, the cutout 912 of each bent sheet 91 is placed from the open segment of the support element 80 to fix the tube 70. Alternatively, the cutout 912 of each bend sheet 91 is rotated 45 degrees to shrink the hooking portion 81 of the support element 80, thus causing a troublesome operation when there are multiple tubes in the building.

The present invention has arisen to mitigate and/or obviate the afore-described disadvantages.

SUMMARY

The primary aspect of the present invention is to provide a U-shaped tube engagement structure which is capable of being simplified to decrease a fabrication cost and to fix the tube on the support element securely.

Another aspect of the present invention is to provide a method of forming the U-shaped tube engagement structure which is capable of simplifying operation to save working time and labor, reduce a labor cost, and the screw is rotated to screw with the internal threaded section of the locking bolt, such that the screw abuts against the force portion of the abutting sheet, and the abutting sheet forces the external face of the tube, thus fixing the abutting sheet with the two hooks of the support element securely.

To obtain above-mentioned aspects, a U-shaped tube engagement structure provided by the present invention contains a fixing sheet, an abutting sheet, a locking bolt, and a screw.

The fixing sheet includes a top edge, a first segment, and a second segment, the first segment has a through orifice defined in a center thereof and configured to accommodate the locking bolt after stamping, the first segment is located on an end of the fixing sheet away from the top edge, and the first segment has a first hooking portion extending leftward on a free end of the first segment.

The second segment is located on the other end of the fixing sheet away from the first segment, and the second segment has a second hooking portion extending on a free end of the second segment and opposite to the first hooking portion.

A side of the second segment adjacent to the second hooking portion is the abutting sheet one-piece parallelly extending, the abutting sheet includes a force portion and a connection portion, the connection portion is one piece connected with the second segment to the force portion proximate to the second hooking portion.

The locking bolt includes a defining portion, a retaining portion, and an internal threaded section that passes through the defining portion and the retaining portion, a diameter of the defining portion is greater than a diameter of the retaining portion.

The screw is screwed with the internal threaded section of the locking bolt.

Features of the tube engagement structure contains after machining the abutting sheet, the abutting sheet is parallelly stacked below the fixing sheet, and a center of the force portion corresponds to the internal threaded section below the defining portion of the locking bolt, the fixing sheet and the abutting sheet are machined so that the first segment and the second segment of the fixing sheet are accurately bent and are perpendicular to the top edge and form an arcuate receiving space with the force portion of the abutting sheet.

A method of forming the U-shaped tube engagement structure contains steps of:

1) stamping, wherein the U-shaped tube engagement structure is stamped flatly to produce a fixing sheet and an abutting sheet;
2) fixing, wherein a locking bolt is stamped to define a retaining portion having a vertical rib in a through orifice of a top edge of the fixing sheet so that a defining portion of the locking bolt is mounted on an end of the fixing sheet facing a ground;
3) first bending and forming, wherein a connection portion of the abutting sheet is bent inward to the defining portion of the locking bolt in a U-shape so that the abutting sheet is parallelly stacked below the fixing sheet, and a center of a force portion corresponds to an internal threaded section of the locking bolt below the defining portion;
4) second stamping and bending forming, wherein the fixing sheet and the abutting sheet are stamped so that a first segment and a second segment of the fixing sheet are accurately bent and are perpendicular to the top edge and form an arcuate receiving space with the force portion of the abutting sheet; and
5) connecting to form the U-shaped tube engagement structure, wherein a screw is fixed on the locking bolt and corresponds to the force portion of the abutting sheet.

DETAILED DESCRIPTION

Figure 1:
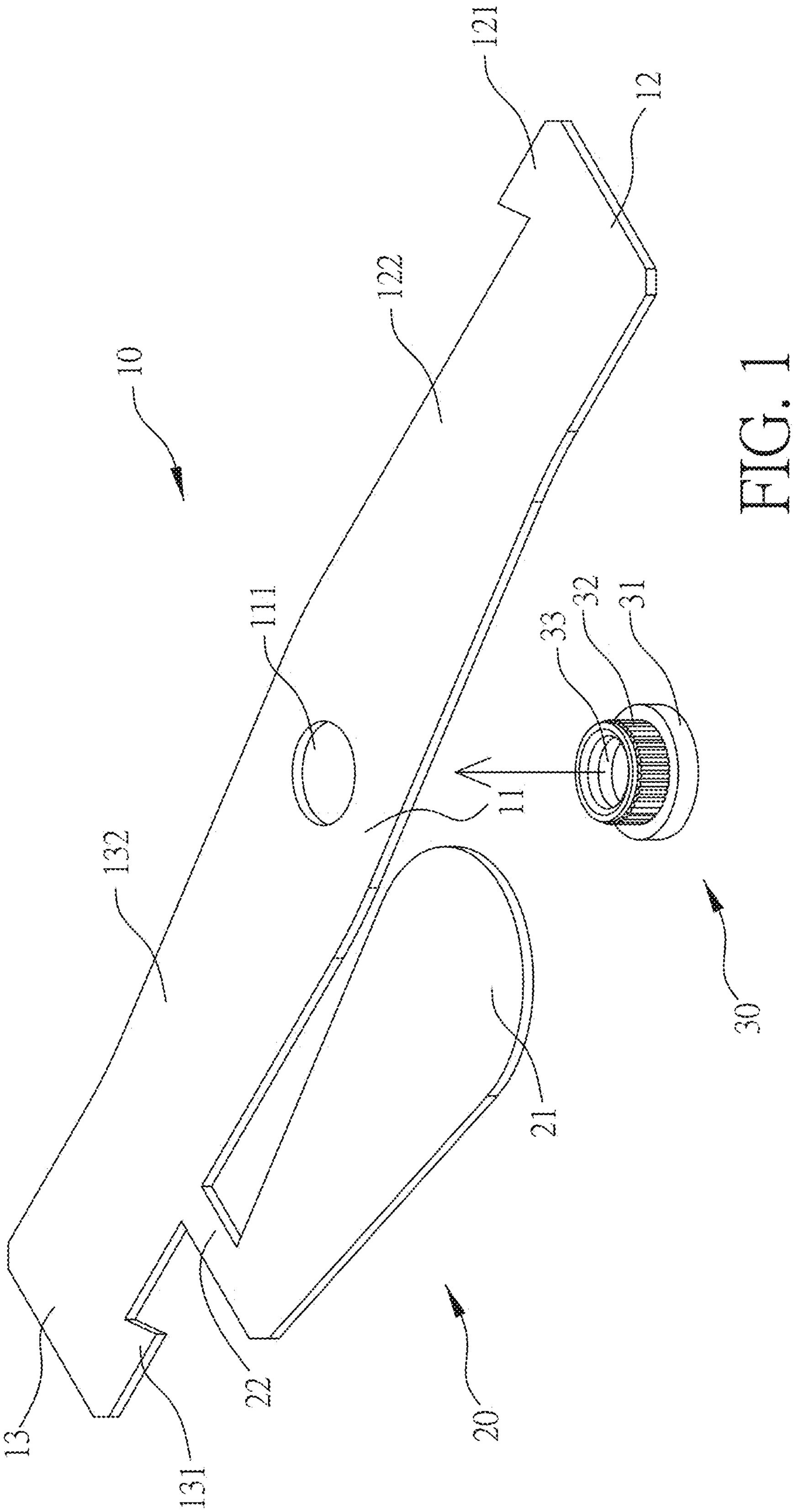
FIG. 1 is a perspective view showing the exploded components of a U-shaped tube engagement structure according to a preferred embodiment of the present invention.

With reference to FIGS. 1-9, a U-shaped tube engagement structure and a method of forming the same according to a preferred embodiment of the present invention, the U-shaped tube engagement structure comprises a fixing sheet 10, an abutting sheet 20, a locking bolt 30, and a screw 40.

The fixing sheet 10 includes a top edge 11, a first segment 12, and a second segment 13, wherein a width of the top edge 11 is equal to a width of the first segment 12 and a width of the second segment 13, the first segment 11 has a through orifice 111 defined in a center thereof and configured to accommodate the locking bolt 30 after stamping, the first segment 12 is located on an end of the fixing sheet 10 away from the top edge 11, and the first segment 12 has a first hooking portion 121 extending leftward in a 7 shape on a free end of the first segment 12, wherein a first gradually decreased portion 122 is defined between the top edge 11 and the first segment 12, and a width of the first gradually decreased portion 122 is decreased gradually.

The second segment 13 is located on the other end of the fixing sheet 10 away from the first segment 12, and the second segment 13 has a second hooking portion 131 extending leftward in a 7 shape on a free end of the second segment 13 and opposite to the first hooking portion 121, wherein a second gradually decreased portion 132 is defined between the top edge 11 and the second segment 13, and a width of the second gradually decreased portion 132 is decreased gradually.

A side of the second segment 13 adjacent to the second hooking portion 131 is the abutting sheet 20 one-piece parallelly extending in an L shape, the abutting sheet 20 includes a force portion 21 in a water droplet shape and includes a connection portion 22, wherein the connection portion 22 is one-piece connected with the second segment 13 to the force portion 21 proximate to the second hooking portion 131.

The locking bolt 30 includes a defining portion 31 in a circle shape, a retaining portion 32 formed in a circle shape and having a vertical rib, and an internal threaded section 33 passes through the defining portion 31 and the retaining portion 32, wherein a diameter of the defining portion 31 is greater than a diameter of the retaining portion 32.

The screw 40 is screwed with the internal threaded section 33 of the locking bolt 30.

The features of the U-shaped tube engagement structure comprises after machining the abutting sheet 20, the abutting sheet 20 is parallelly stacked below the fixing sheet 10, and a center of the force portion 21 corresponds to the internal threaded section 33 below the defining portion 31 of the locking bolt 30, wherein the fixing sheet 10 and the abutting sheet 20 are machined so that the first gradually decreased portion 122 of the first segment 12 and the second gradually decreased portion 132 of the second segment 13 of the fixing sheet 10 are accurately bent and are perpendicular to the top edge 11 and form an arcuate receiving space with the force portion 21 of the abutting sheet 20, wherein the screw 40 is fixed on the locking bolt 30 and corresponds to the force portion 21 of the abutting sheet 20.

Figure 2:
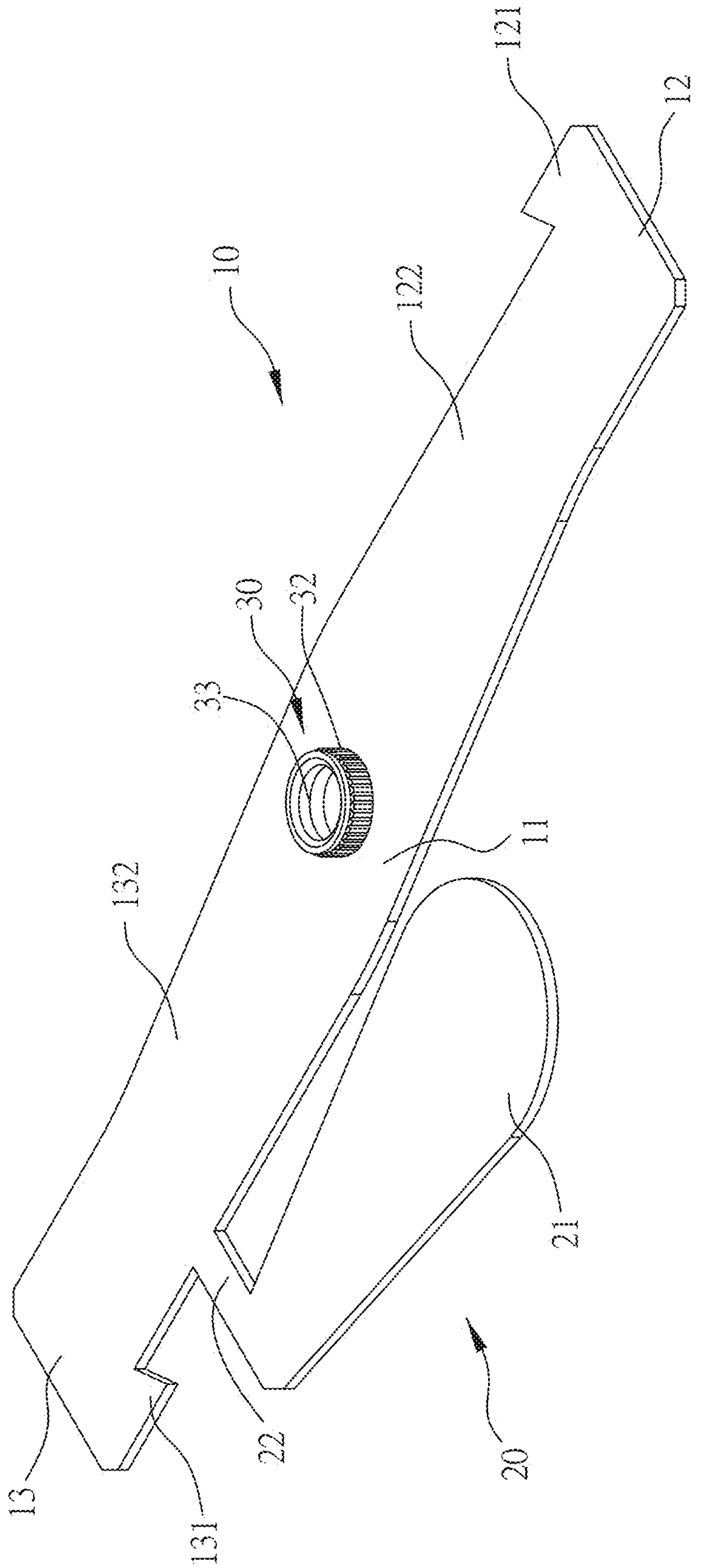
FIG. 2 is a perspective view showing the assembly of the U-shaped tube engagement structure according to the preferred embodiment of the present invention.
Figure 3:
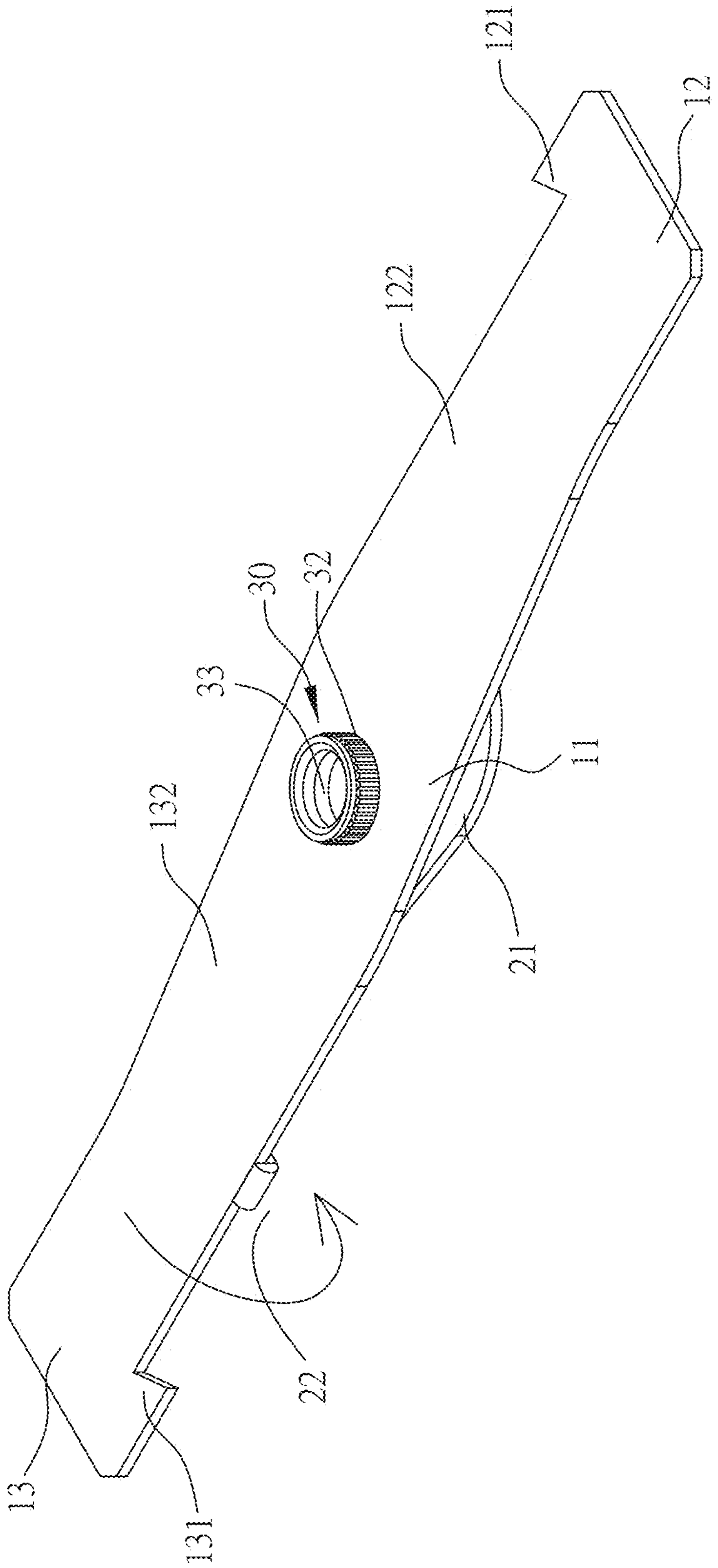
FIG. 3 is a perspective view showing the operation of the U-shaped tube engagement structure according to the preferred embodiment of the present invention.
Figure 4:
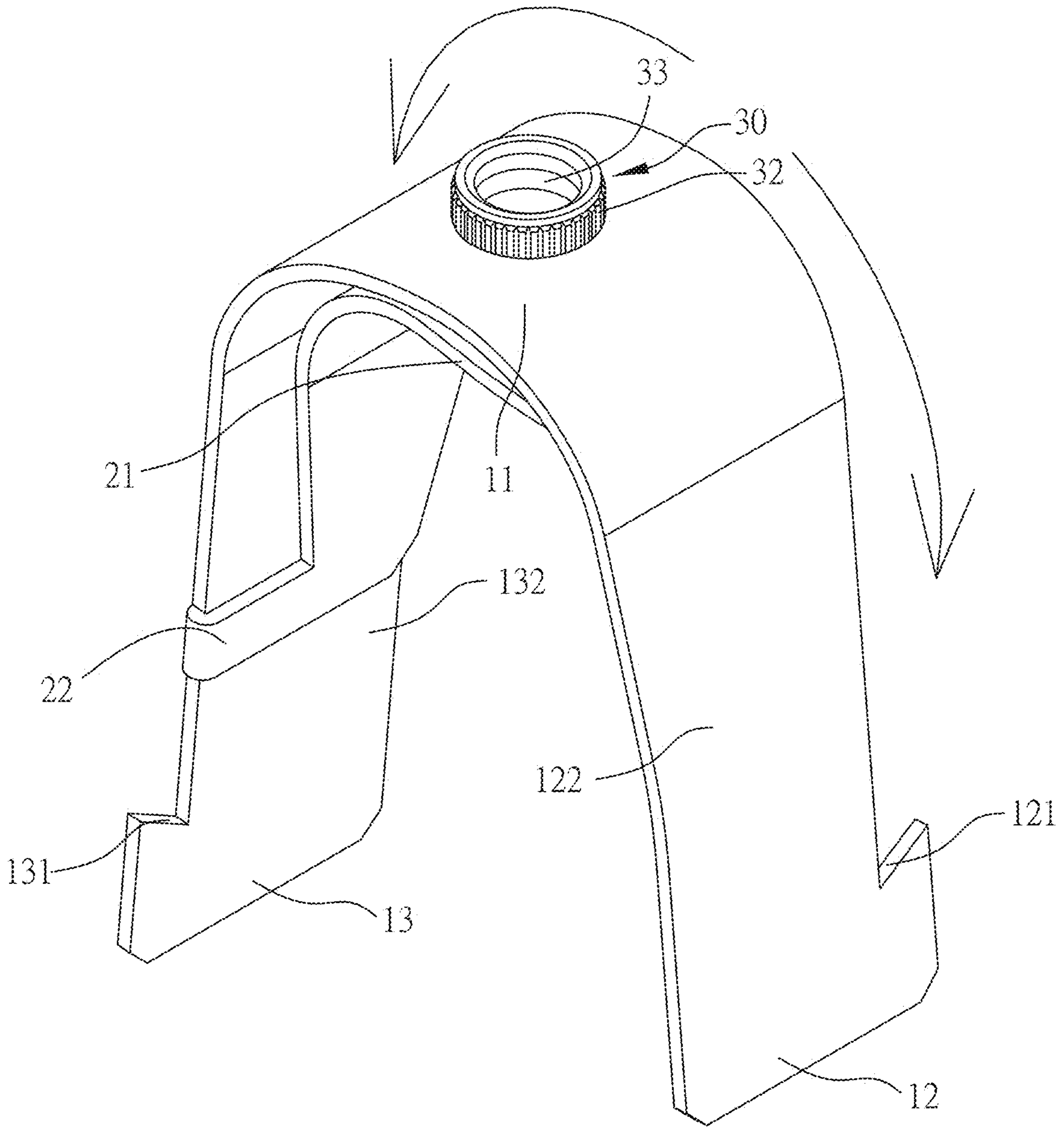
FIG. 4 is another perspective view showing the operation of the U-shaped tube engagement structure according to the preferred embodiment of the present invention.
Figure 5:
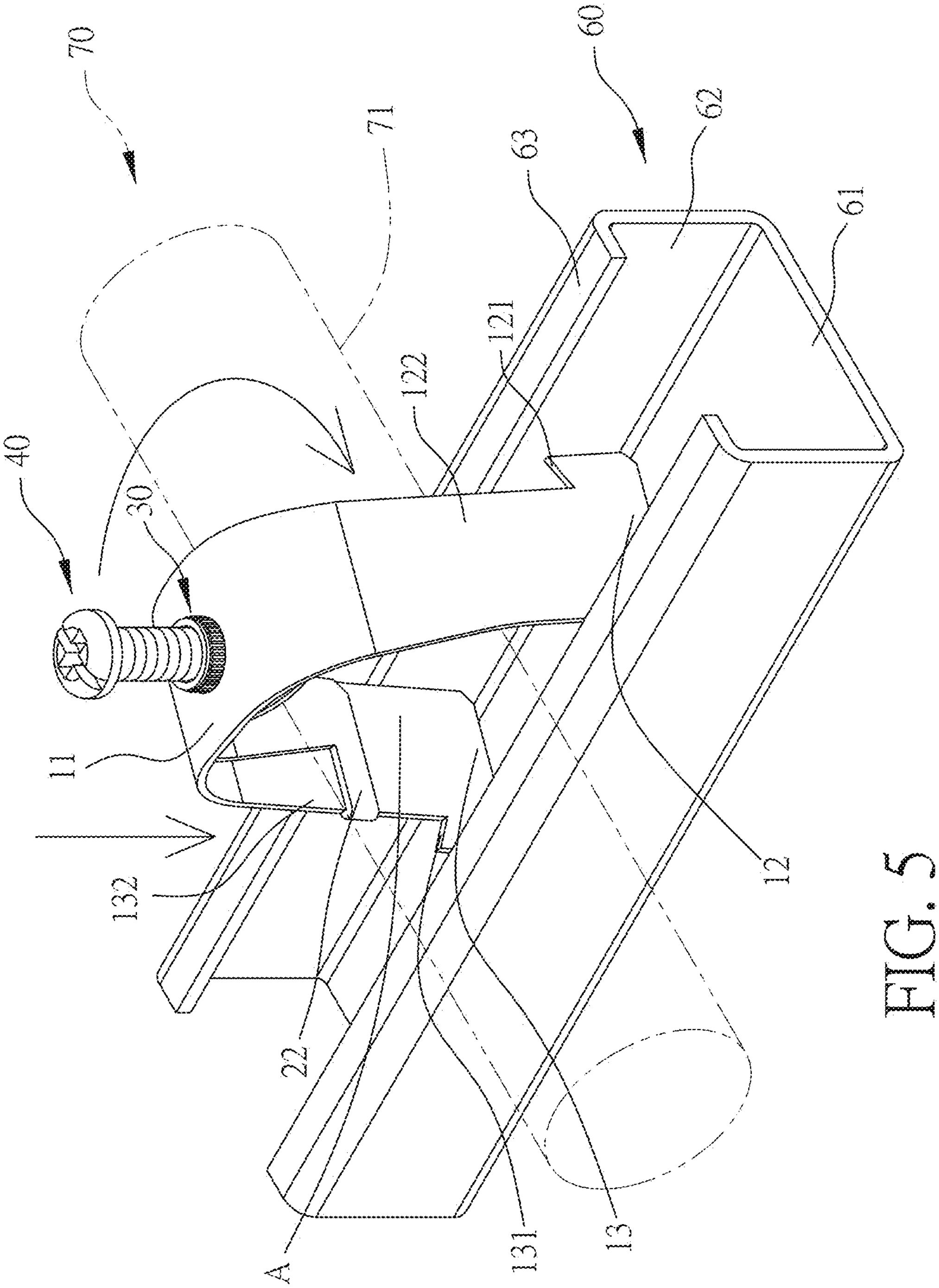
FIG. 5 is a perspective view showing the application of the U-shaped tube engagement structure according to the preferred embodiment of the present invention.
Figure 6:
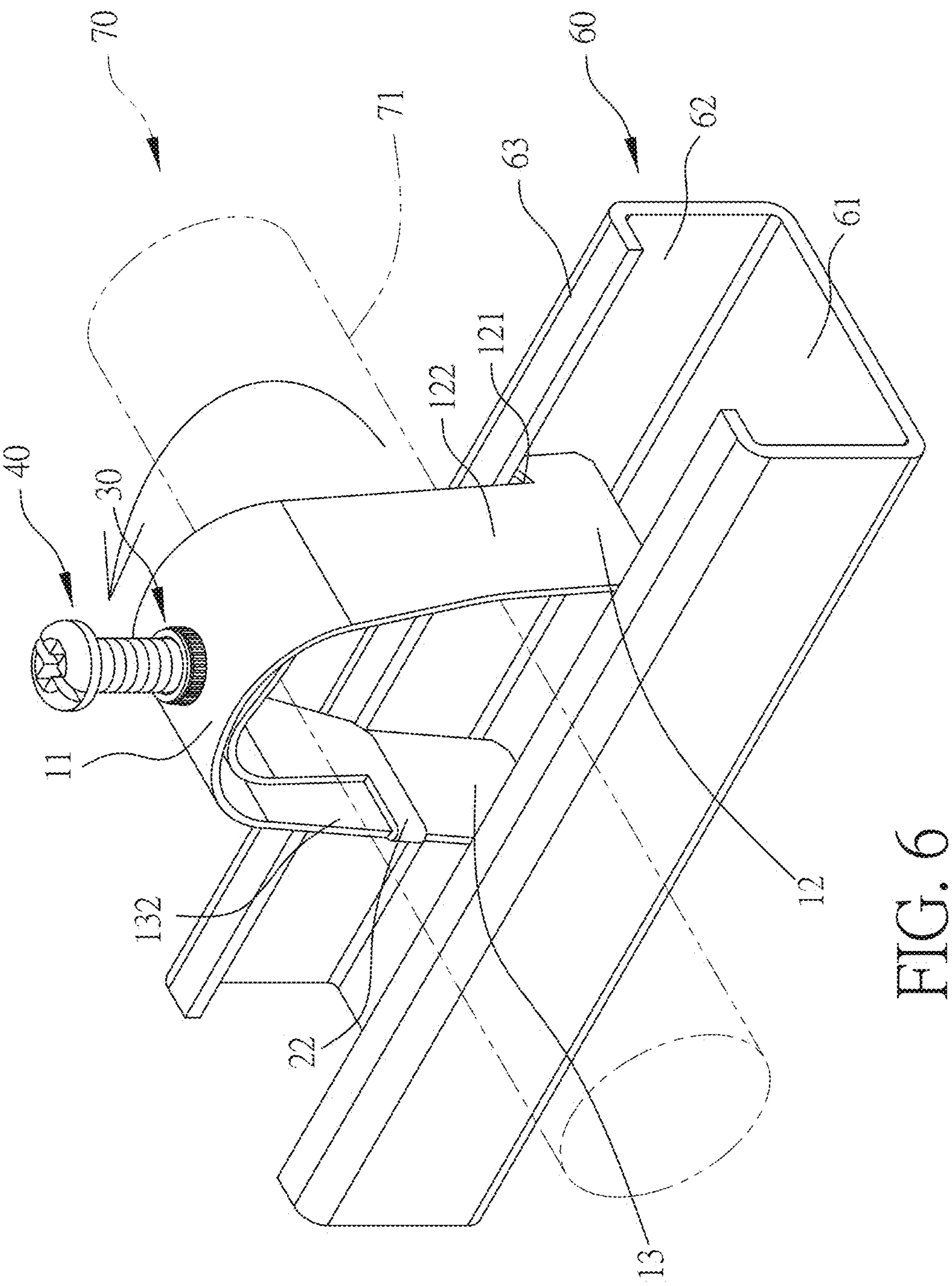
FIG. 6 is another perspective view showing the application of the U-shaped tube engagement structure according to the preferred embodiment of the present invention.
Figure 7:
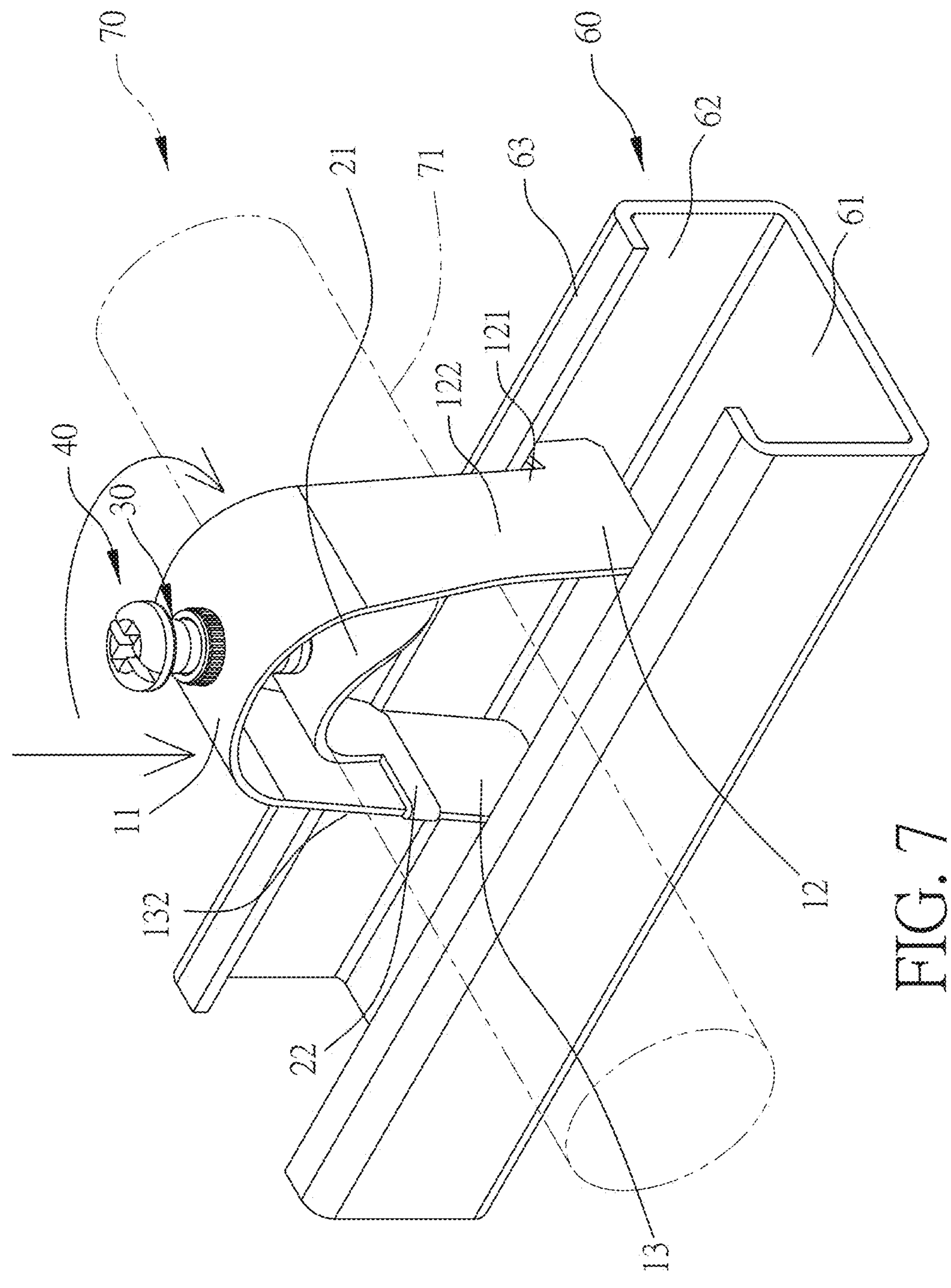
FIG. 7 is also another perspective view showing the application of the U-shaped tube engagement structure according to the preferred embodiment of the present invention.
Figure 8:
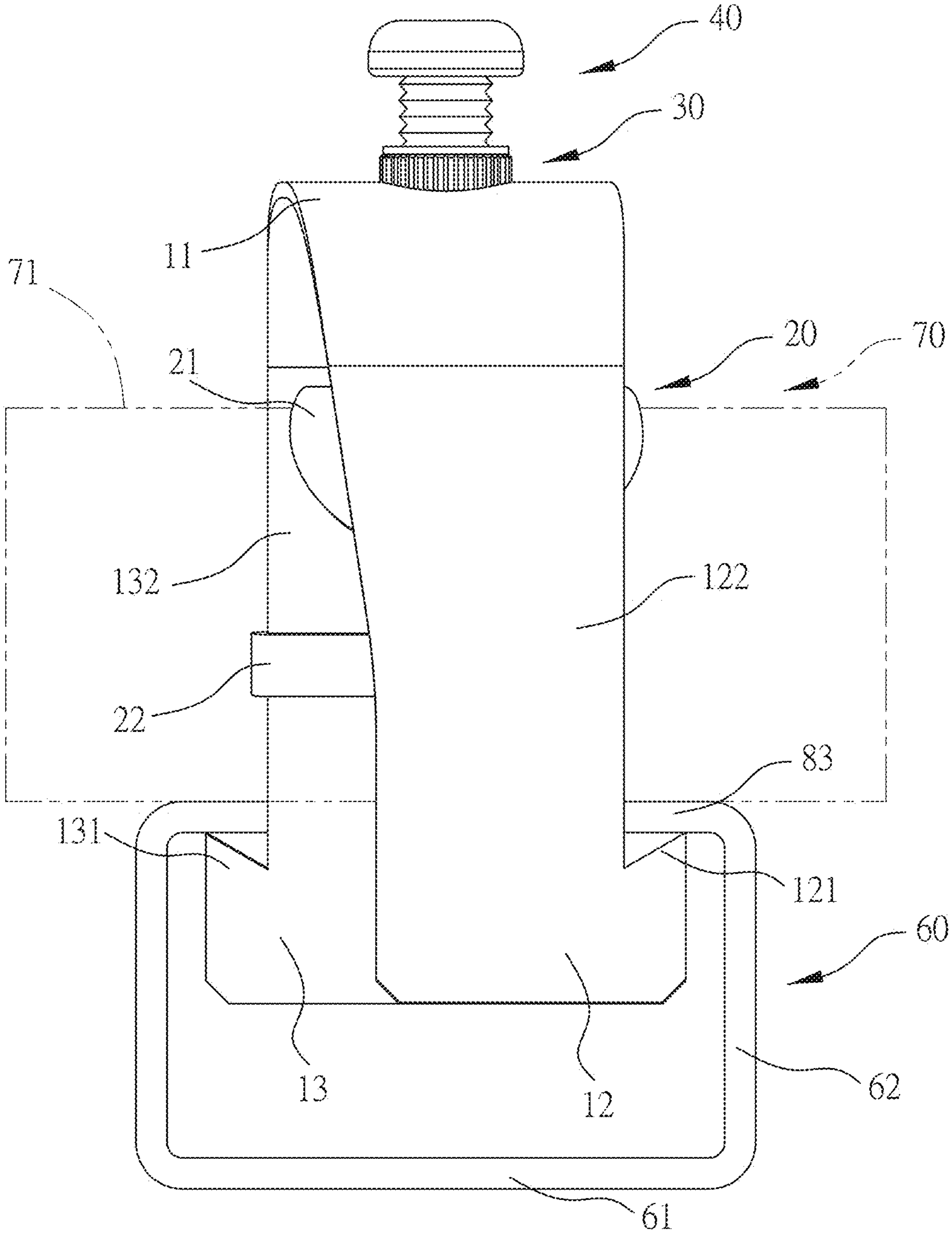
FIG. 8 is a side elevational view showing the application of the U-shaped tube engagement structure according to the preferred embodiment of the present invention.
Figure 9:
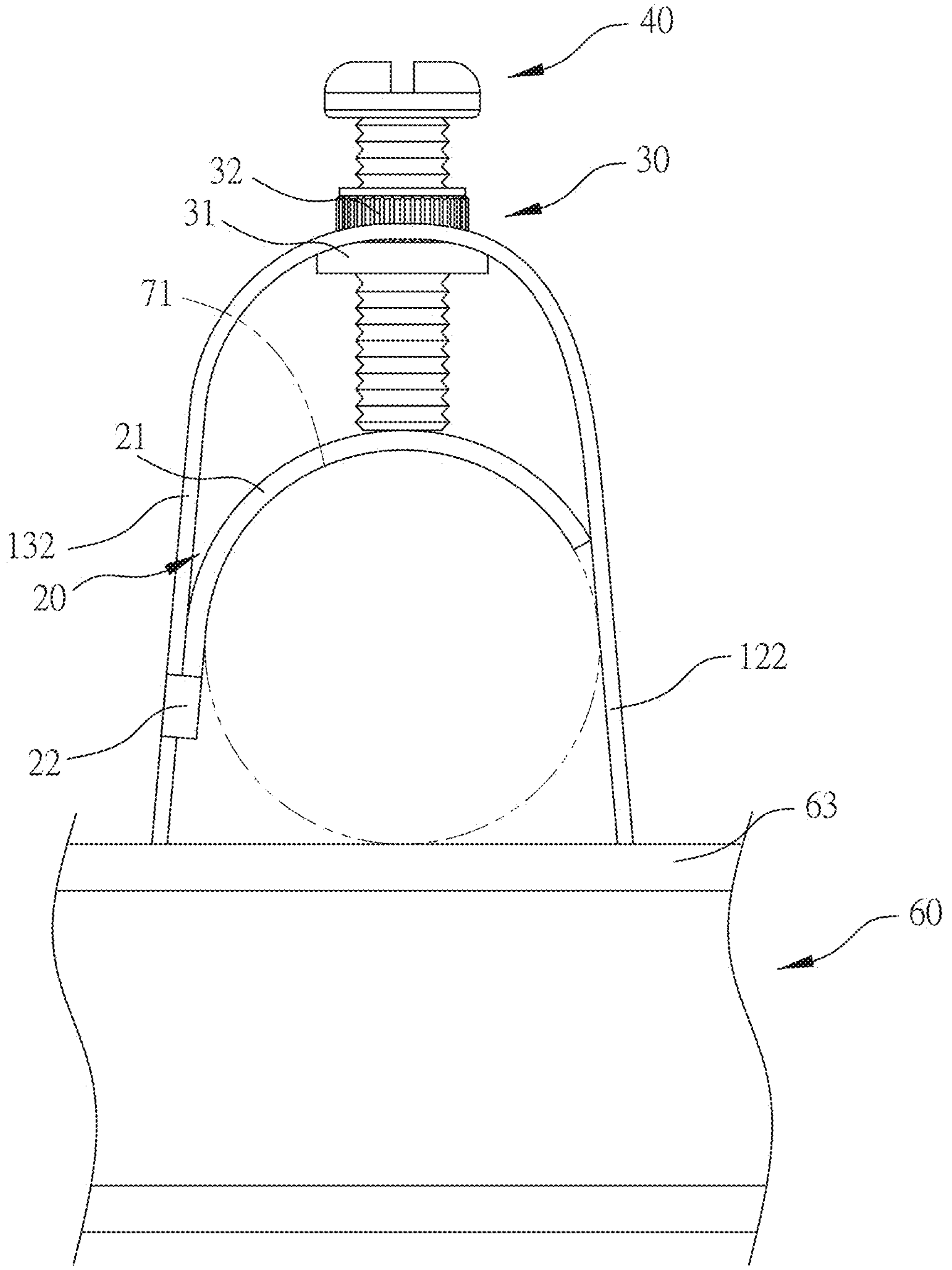
FIG. 9 is a side elevational view showing the application of a part of the U-shaped tube engagement structure according to the preferred embodiment of the present invention.
Figure 10:
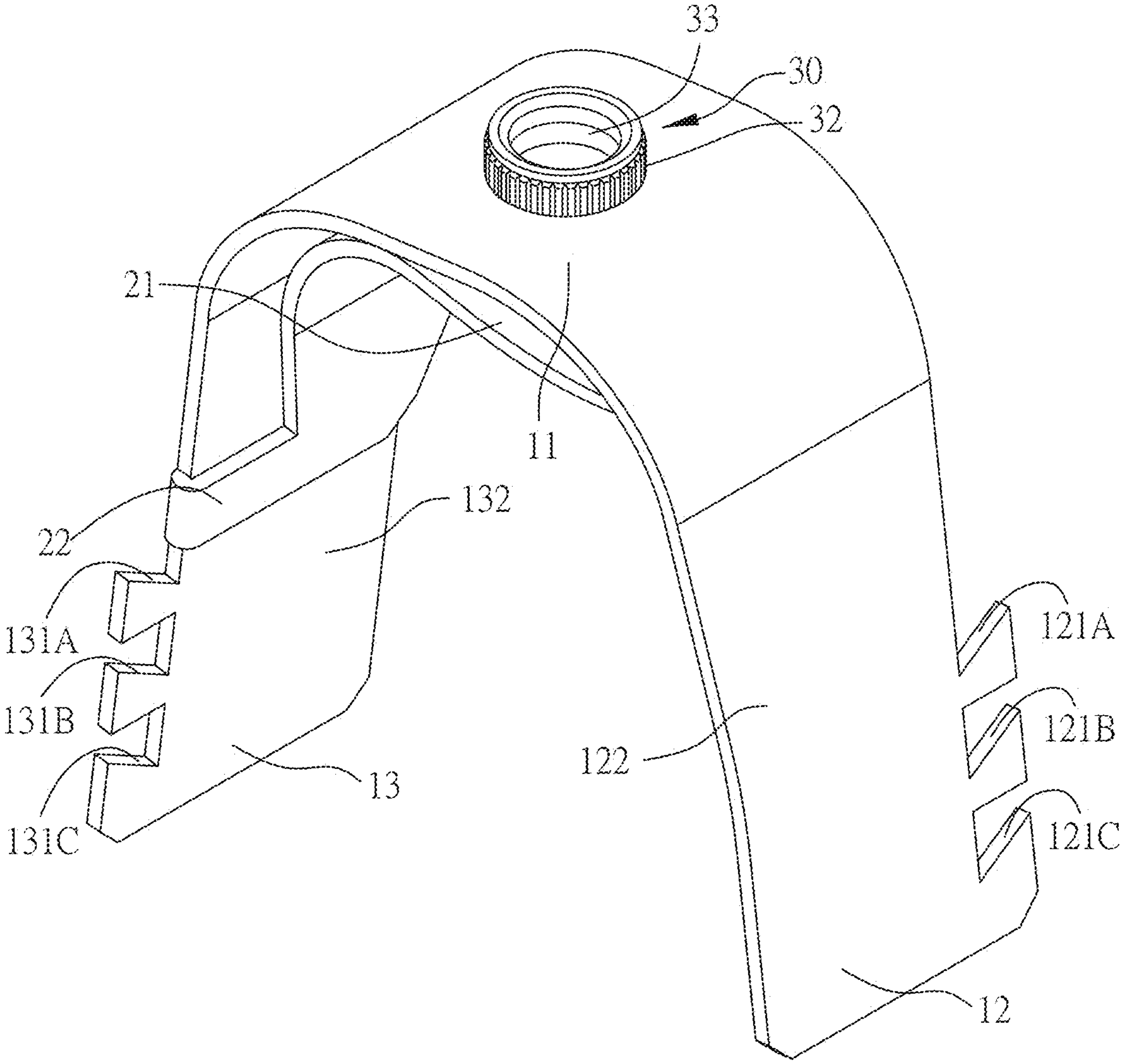
FIG. 10 is a perspective view showing the exploded components of a U-shaped tube engagement structure according to another preferred embodiment of the present invention.
Figure 11:
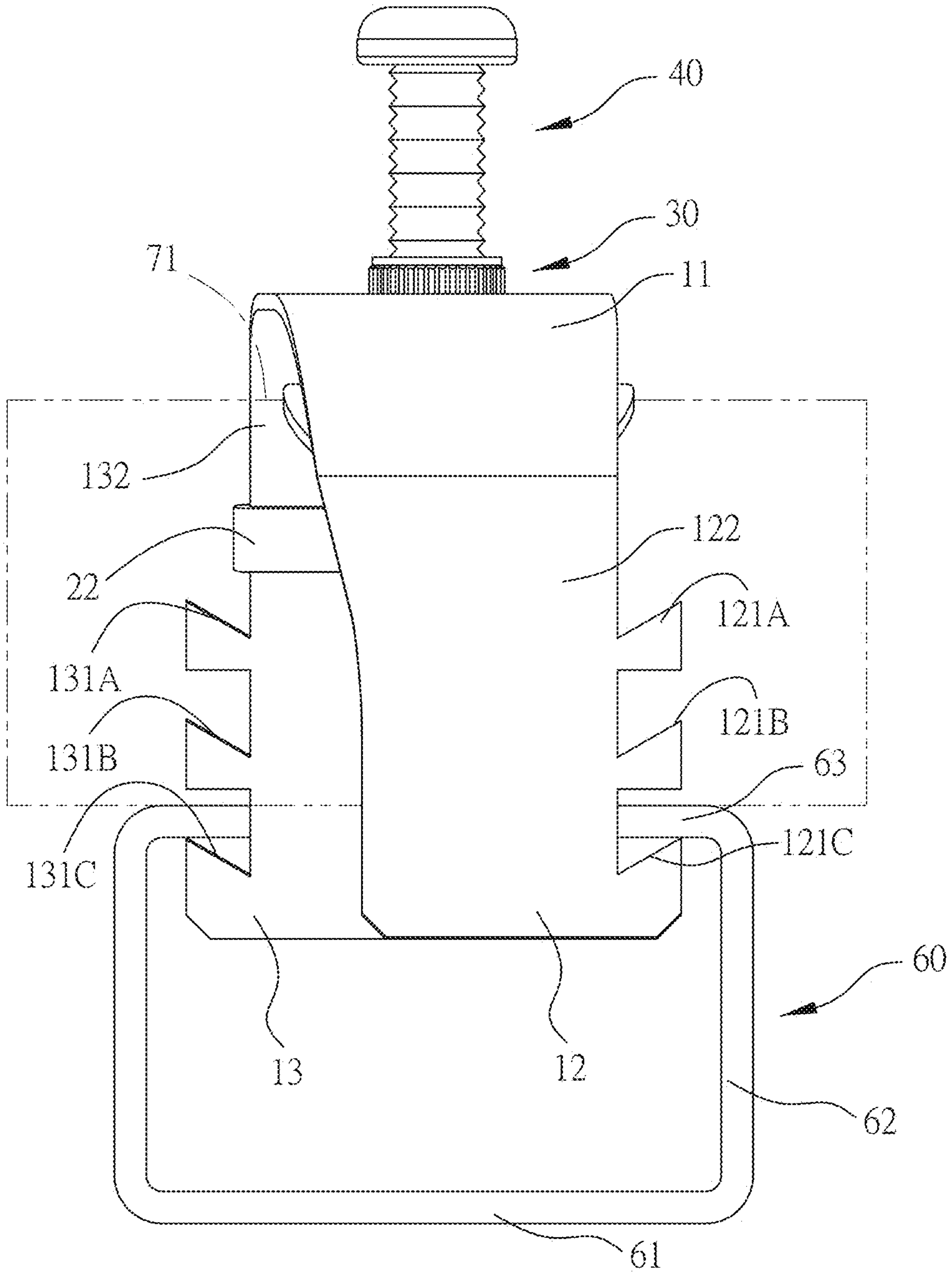
FIG. 11 is a side elevational view showing the application of the U-shaped tube engagement structure according to the preferred embodiment of the present invention.
Figure 12:
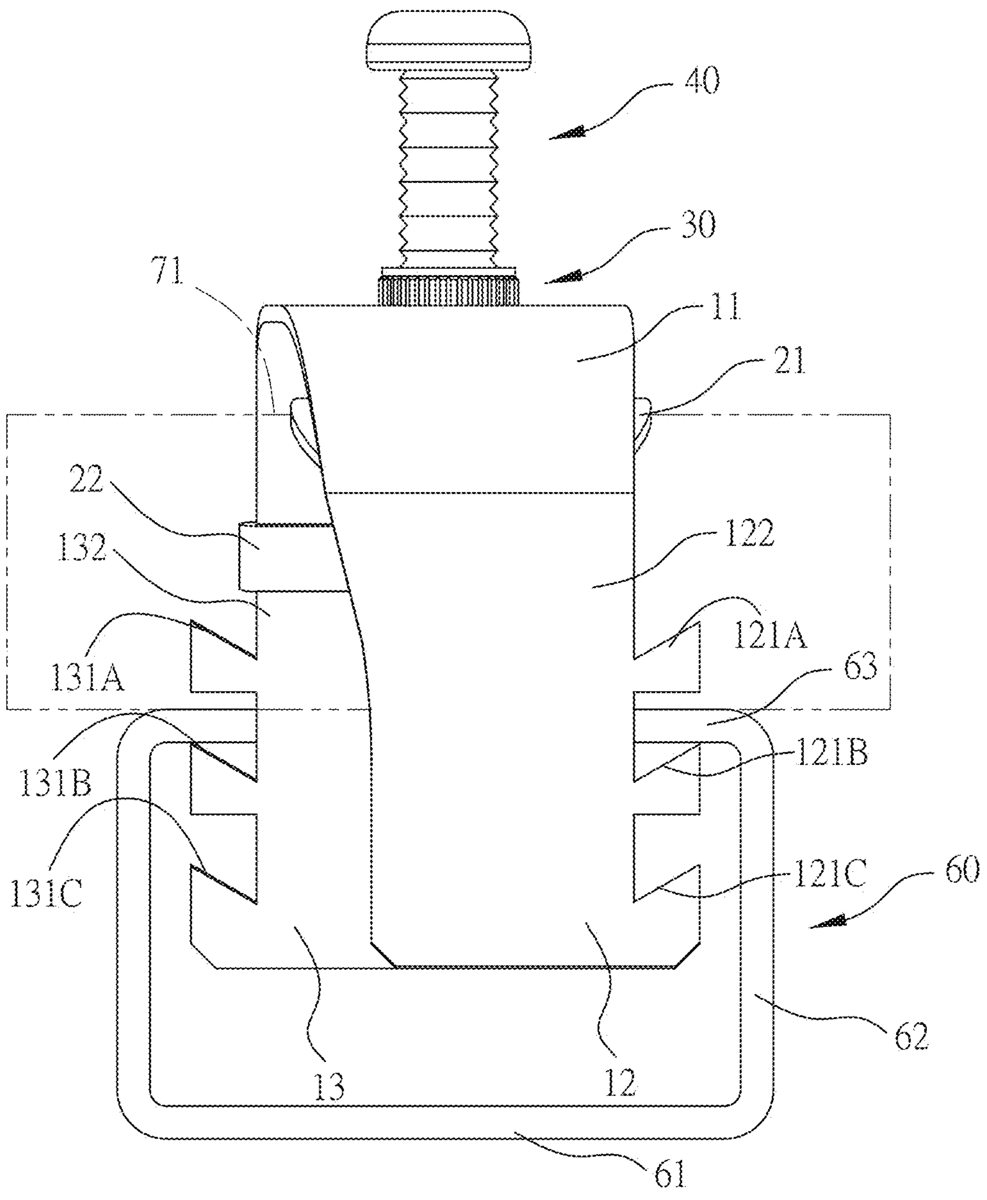
FIG. 12 is another side elevational view showing the application of the U-shaped tube engagement structure according to the preferred embodiment of the present invention.
Figure 13:
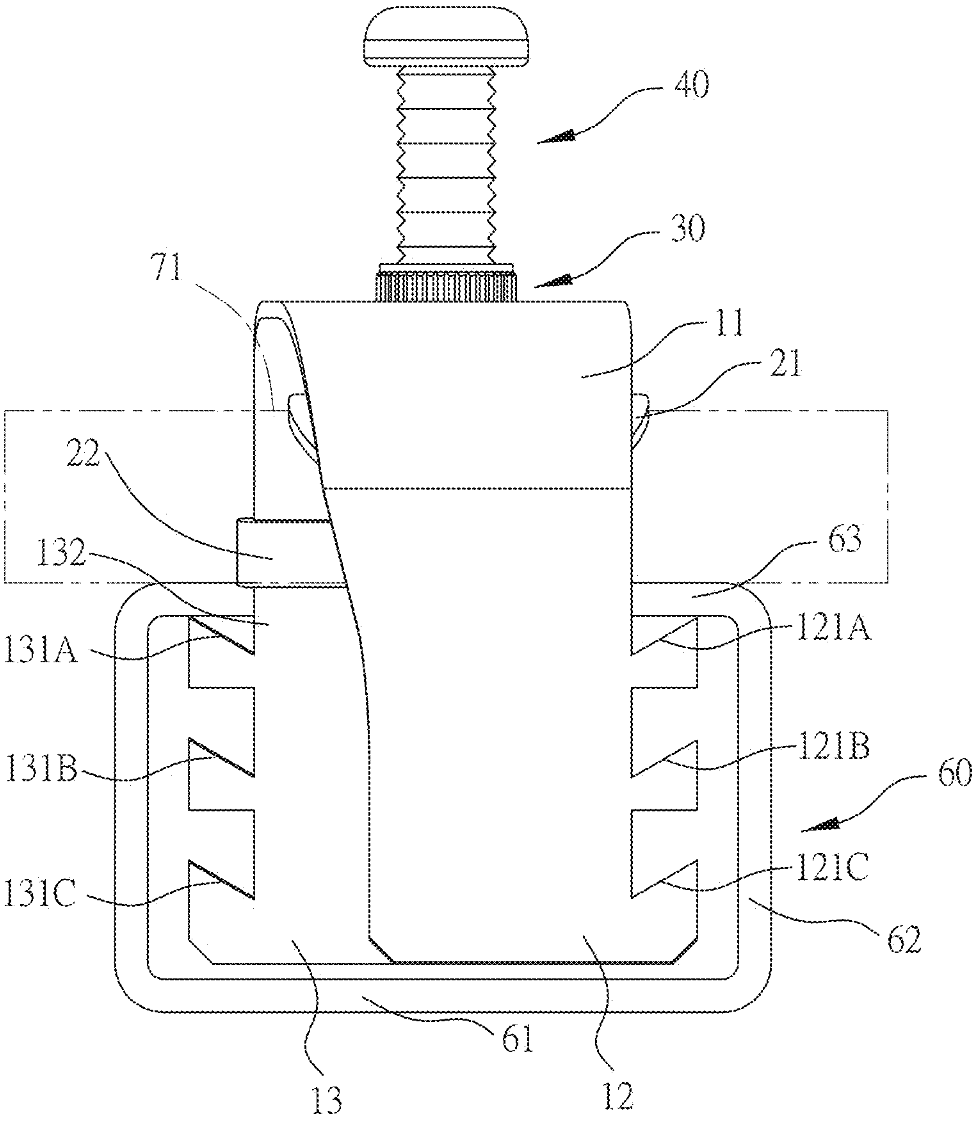
FIG. 13 is also another side elevational view showing the application of the U-shaped tube engagement structure according to the preferred embodiment of the present invention.
Figure 14:
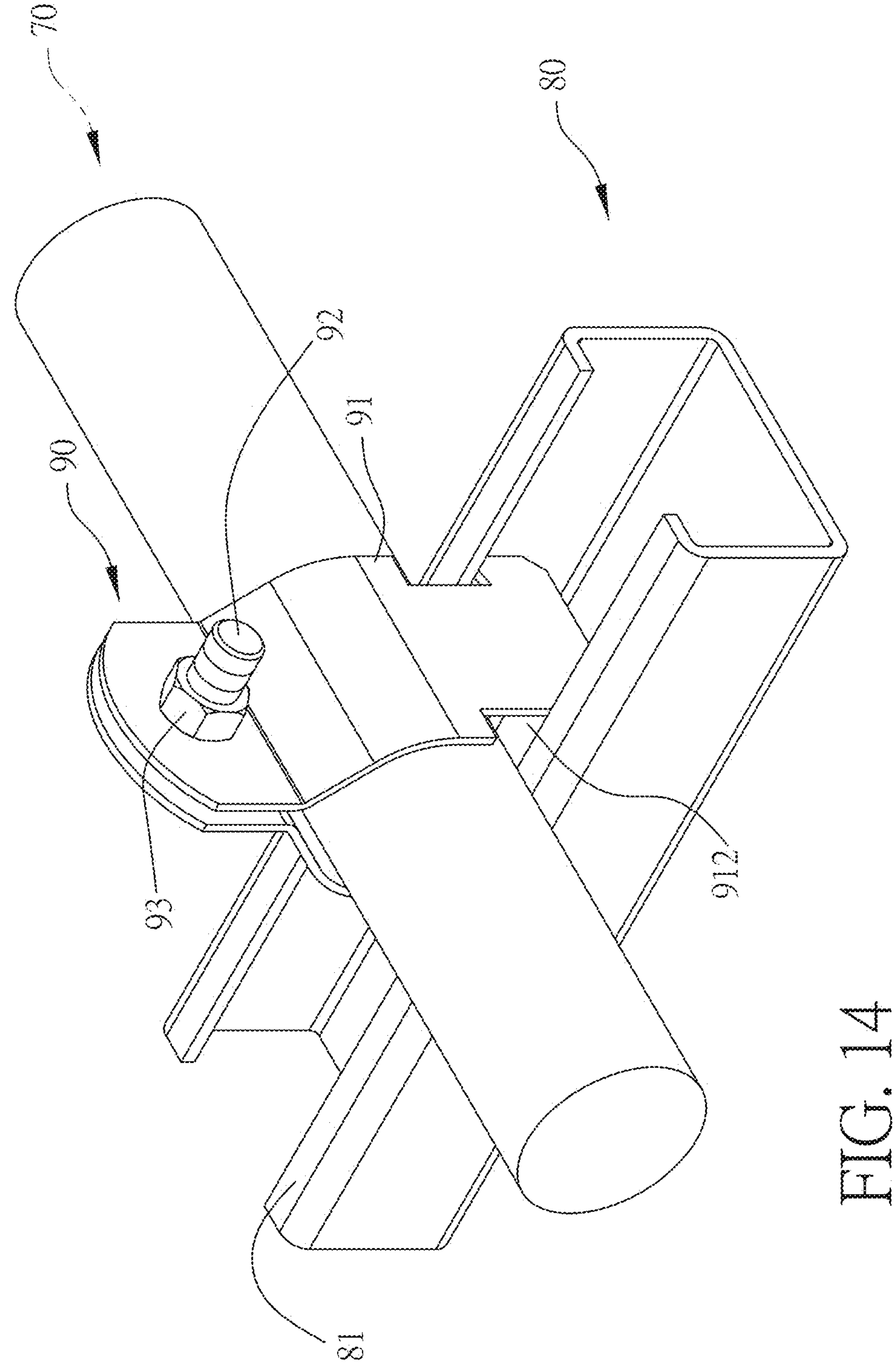
FIG. 14 PRIOR ART
FIG. 14 is a perspective view showing the assembly of a conventional tube engagement structure.
Figure 15:
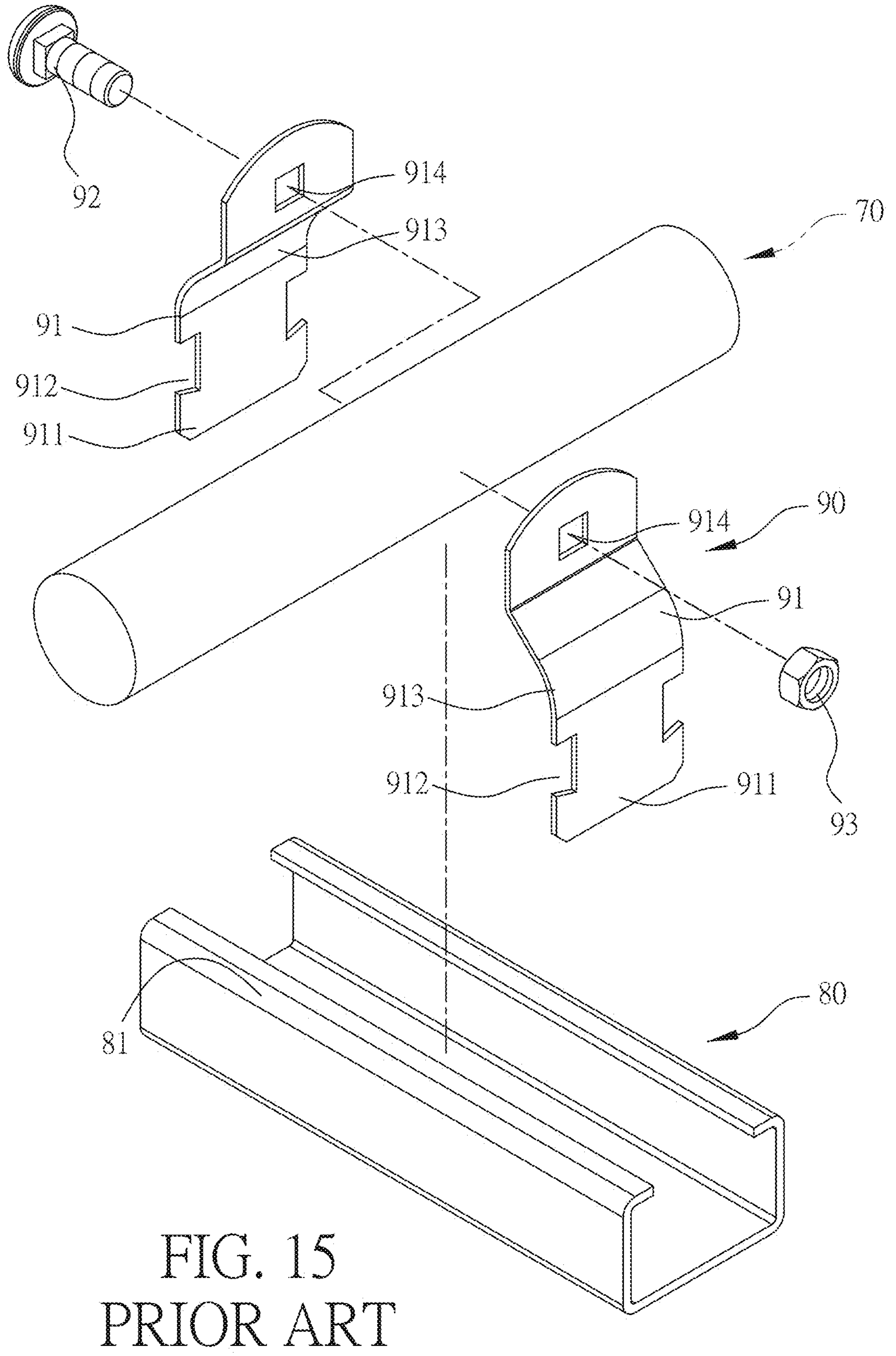
FIG. 15 PRIOR ART
FIG. 15 is a perspective view showing the exploded components of the conventional tube engagement structure.

The method of forming the U-shaped tube engagement structure comprises steps of:

1) stamping, as shown in FIG. 1, wherein a U-shaped tube engagement structure is stamped to produce the fixing sheet 10 and the abutting sheet 20;
2) fixing, as shown in FIG. 2, wherein the locking bolt 30 is stamped to define the retaining portion 32 having a vertical rib in the through orifice 111 of the top edge 11 of the fixing sheet 10 so that the defining portion 31 of the locking bolt 30 is mounted on an end of the fixing sheet 10 facing a ground;
3) first bending and forming, as illustrated in FIG. 3, wherein the connection portion 22 of the abutting sheet 20 is bent inward to the defining portion 31 of the locking bolt 30 in a U-shape so that the abutting sheet 20 is parallelly stacked below the fixing sheet 10, and the center of the force portion 21 corresponds to the internal threaded section 33 of the locking bolt 30 below the defining portion 31;
4) second stamping and bending forming, as illustrated in FIG. 4, wherein the fixing sheet 10 and the abutting sheet 20 are stamped so that the first gradually decreased portion 122 of the first segment 12 and the second gradually decreased portion 132 of the second segment 13 of the fixing sheet 10 are accurately bent and are perpendicular to the top edge 11 and form the arcuate receiving space with the force portion 21 of the abutting sheet 20; and 5) connecting to form the U-shaped tube engagement structure, as shown in FIG. 5, wherein the screw 40 is fixed on the locking bolt 30 and corresponds to the force portion 21 of the abutting sheet 20.

Referring to FIGS. 5-9, in operation, the U-shaped tube engagement structure is configured to connect a tube 70 and a support element 60, wherein the tube 70 includes an external face 71, the support element 60 includes a bottom fence 61 and two peripheral fences 62 vertically extending from the bottom fence 61, wherein a respective one bottom fence 62 has a hook 63 extending inward, the tube 70 is disposed on an edge of the hook 63 of the support element 63, then the first gradually decreased portion 122 of the first segment 12 and the second gradually decreased portion 132 of the second segment 13 of the fixing sheet 10 are accurately bent and are perpendicular to the top edge 11 and form the arcuate receiving space A, as shown in FIG. 5, wherein the first hooking portion 121 of the first segment 12 and the second segment 131 of the second segment 13 of the fixing sheet 10 are placed to the bottom fence 61 of the support element 60 so that the force portion 21 of the abutting sheet 20 contacts with the external face 71 of the tube 70, the first hooking portion 121 of the first segment 12 and the second hooking portion 131 of the second segment 13 are aligned with the two hooks 63 of the two bottom fences 62 and face the support element 60 vertically, the screw 40 is rotated to screw with the internal threaded section 33 of the locking bolt 30 below the defining portion 31, such that the screw 40 abuts against the force portion 21 of the abutting sheet 20, the abutting sheet 20 forces the external face 71 of the tube 70, and the hooking portion 121 of the first segment and the second hooking portion 131 of the second segment 13 of the fixing sheet 10 hook with the two hooks 63, thus fixing the fixing sheet 10 with the two hooks 63 of the support element 60.

In another embodiment, as shown in FIGS. 10-13, the free end of the first segment 12 of the fixing sheet 10 has three first hooking portions 121A, 121B, 121C with different heights, wherein the three first hooking portions 121A, 121B, 121C extend leftward in a 7 shape.

The free end of the second segment 13 of the fixing sheet 10 has three-second hooking portions 131A, 131B, 131C with different heights, wherein the three-second hooking portions 131A, 131B, 131C extend in a 7 shape and are opposite to the three first hooking portions 121A, 121B, 121C.

The three first hooking portions 121A, 121B, 121C of the first segment 12 of the fixing sheet 10 and the three-second hooking portions 131A, 131B, 131C of the second segment 13 of the fixing sheet 10 mates with the tubes 70 of different diameters to be fixed on the two hooks 63 which extend vertically from of two peripheral fences 62 of the support element 60, hence the U-shaped tube engagement structure is configured to fix the tubes 70 with different diameters to reduce components in a working project.

Accordingly, the U-shaped tube engagement structure is capable of being simplified to decrease a fabrication cost and to fix the tube on the support element securely.

The method of forming the U-shaped tube engagement structure is capable of simplifying operation to save working time and labor and reduce a labor cost, and the screw 40 is rotated to screw with the internal threaded section 33 of the locking bolt 30, such that the screw 40 abuts against the force portion 21 of the abutting sheet 20, and the abutting sheet 20 forces the external face 71 of the tube 70, thus fixing the abutting sheet 20 with the two hooks 63 of the support element 60 securely.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A U-shaped tube engagement structure comprising: a fixing sheet, an abutting sheet and a locking bolt;

the fixing sheet includes a top edge, a first segment, and a second segment, wherein the first segment has a through orifice defined in a center thereof and configured to accommodate the locking bolt after stamping, the first segment is located on an end of the fixing sheet away from the top edge, and the first segment has a first hooking portion extending leftward on a free end of the first segment;

wherein the second segment is located on the other end of the fixing sheet away from the first segment, and the second segment has a second hooking portion extending on a free end of the second segment and opposite to the first hooking portion;

wherein a side of the second segment adjacent to the second hooking portion is the abutting sheet one-piece parallelly extending, the abutting sheet includes a force portion and a connection portion, wherein the connection portion is one-piece connected with the second segment to the force portion proximate to the second hooking portion;

wherein the locking bolt includes a defining portion, a retaining portion, and an internal threaded section passes through the defining portion and the retaining portion, wherein a diameter of the defining portion is greater than a diameter of the retaining portion;

wherein features of the tube engagement structure comprises after machining the abutting sheet, the abutting sheet is parallelly stacked below the fixing sheet, and a center of the force portion corresponds to the internal threaded section below the defining portion of the locking bolt, wherein the fixing sheet and the abutting sheet are machined so that the first segment and the second segment of the fixing sheet are accurately bent and are perpendicular to the top edge and form an arcuate receiving space with the force portion of the abutting sheet.

2. The U-shaped tube engagement structure as claimed in claim 1, wherein a width of the top edge is equal to a width of the first segment and a width of the second segment, the first segment is located on an end of the fixing sheet away from the top edge, wherein a first gradually decreased portion is defined between the top edge and the first segment, and a width of the first gradually decreased portion is decreased gradually, wherein a second gradually decreased portion is defined between the top edge and the second segment, and a width of the second gradually decreased portion is decreased gradually.

3. The U-shaped tube engagement structure as claimed in claim 1, wherein the first hooking portion and the second hooking portion are in a 7 shape, the abutting sheet extends in an L shape, and the force portion is in a water droplet shape.

4. The U-shaped tube engagement structure as claimed in claim 1, wherein the defining portion of the locking bolt is in a circle shape, the retaining portion is formed in a circle shape and has a vertical rib, and a diameter of the defining portion is greater than a diameter of the retaining portion.

5. The U-shaped tube engagement structure as claimed in claim 1, wherein the free end of the first segment of the fixing sheet has three first hooking portions with different heights, wherein the three first hooking portions extend leftward in a 7 shape; and the free end of the second segment of the fixing sheet has three-second hooking portions with different heights, wherein the three-second hooking portions extend in a 7 shape and are opposite to the three first hooking portions.

6. The U-shaped tube engagement structure as claimed in claim 1, further comprises a screw screwed with the internal threaded section of the locking bolt, and the screw is fixed on the locking bolt and corresponds to the force portion of the abutting sheet.

7. The U-shaped tube engagement structure as claimed in claim 1, a method of forming the U-shaped tube engagement structure comprises steps of:

A) stamping, wherein the U-shaped tube engagement structure is stamped flatly to produce a fixing sheet and an abutting sheet;

B) fixing, wherein a locking bolt is stamped to define a retaining portion having a vertical rib in a through orifice of a top edge of the fixing sheet so that a defining portion of the locking bolt is mounted on an end of the fixing sheet facing a ground;

C) first bending and forming, wherein a connection portion of the abutting sheet is bent inward to the defining portion of the locking bolt in a U-shape so that the abutting sheet is parallelly stacked below the fixing sheet, and a center of a force portion corresponds to an internal threaded section of the locking bolt below the defining portion;

D) second stamping and bending forming, wherein the fixing sheet and the abutting sheet are stamped so that a first segment and a second segment of the fixing sheet are accurately bent and are perpendicular to the top edge and form an arcuate receiving space with the force portion of the abutting sheet; and E) connecting to form the U-shaped tube engagement structure, wherein a screw is fixed on the locking bolt and corresponds to the force portion of the abutting sheet.

8. The method as claimed in claim 7, wherein the fixing sheet includes a top edge, a first segment, and a second segment, wherein the first segment has a through orifice defined in a center thereof and configured to accommodate the locking bolt after stamping, the first segment is located on an end of the fixing sheet away from the top edge, and the first segment has a first hooking portion extending leftward on a free end of the first segment;

wherein the second segment is located on the other end of the fixing sheet away from the first segment, and the second segment has a second hooking portion extending on a free end of the second segment and opposite to the first hooking portion; and wherein a side of the second segment adjacent to the second hooking portion is the abutting sheet one-piece parallelly extending, the abutting sheet includes a force portion and a connection portion, wherein the connection portion is one-piece connected with the second segment to the force portion proximate to the second hooking portion.

9. The method as claimed in claim 7, wherein the free end of the first segment of the fixing sheet has three first hooking portions with different heights, wherein the three first hooking portions extend leftward in a 7 shape; and the free end of the second segment of the fixing sheet has three-second hooking portions with different heights, wherein the three-second hooking portions extend in a 7 shape and are opposite to the three first hooking portions.

* * * * *